July 12, 1949.　　　　　W. H. HUNTER　　　　　2,475,705
EXPANSIBLE RING AND GROOVE THEREFOR
Filed Aug. 7, 1946　　　　　　　　　　　　　3 Sheets-Sheet 1
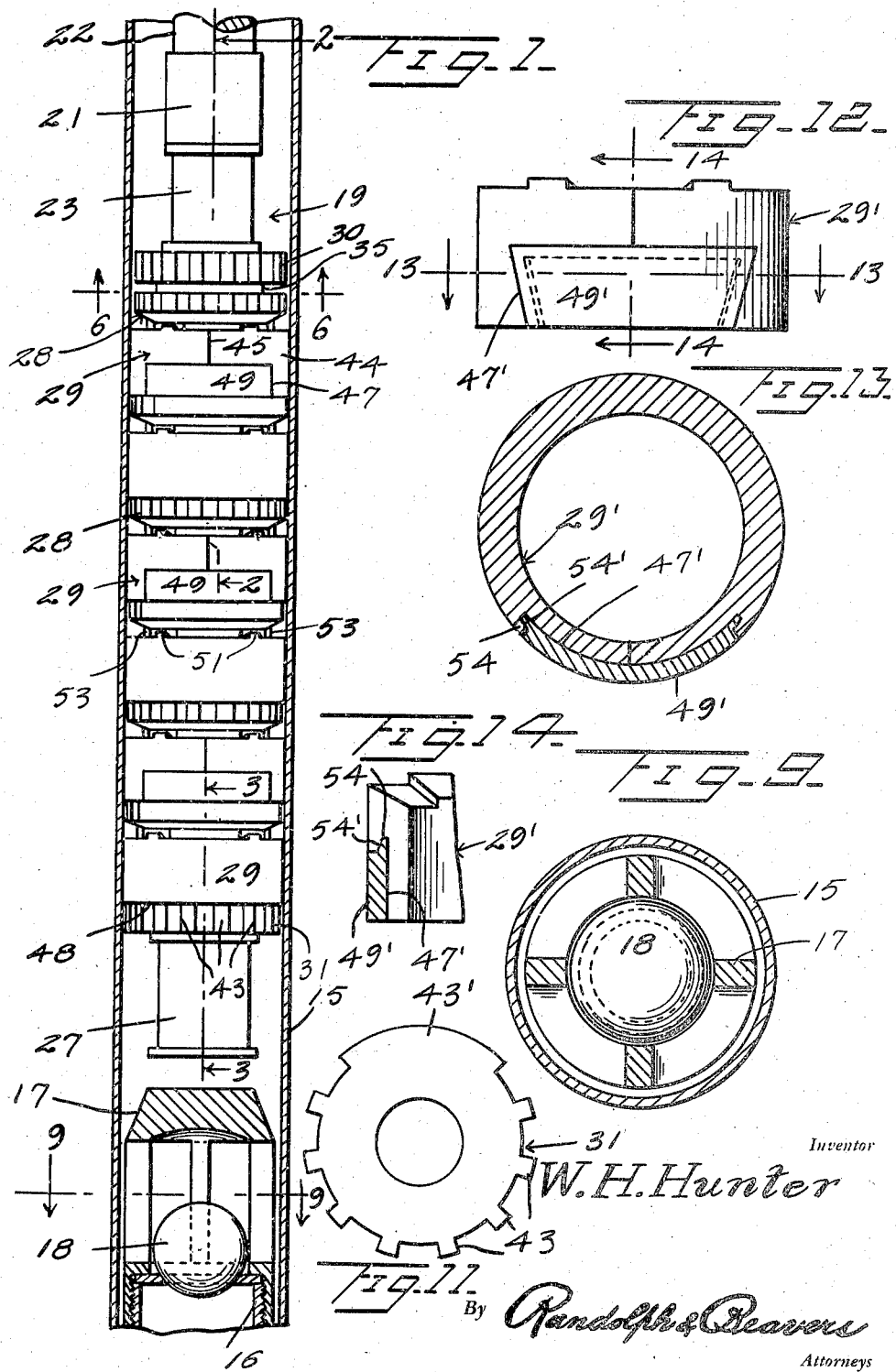
Inventor
W. H. Hunter
By Randolph & Beavers
Attorneys

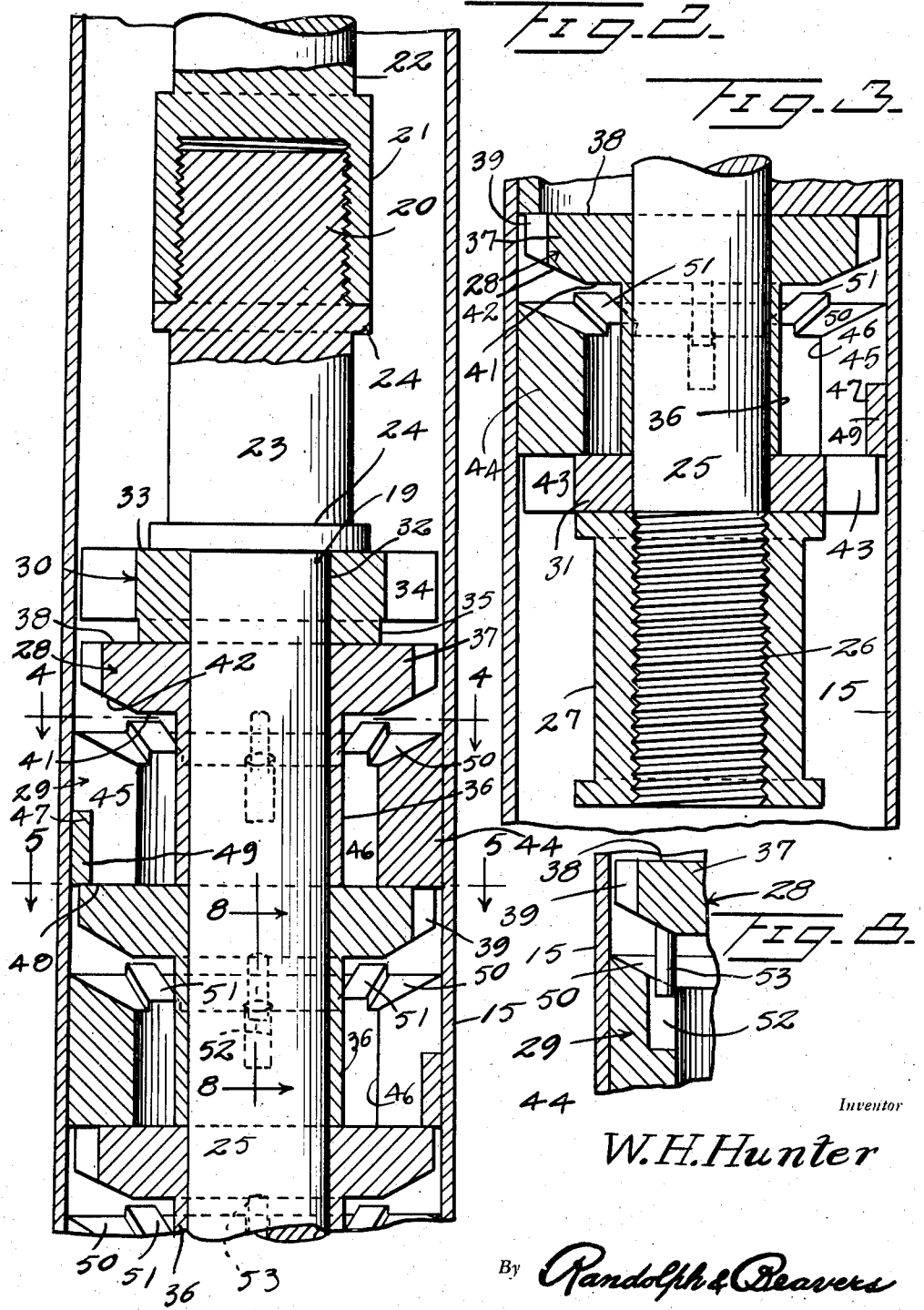

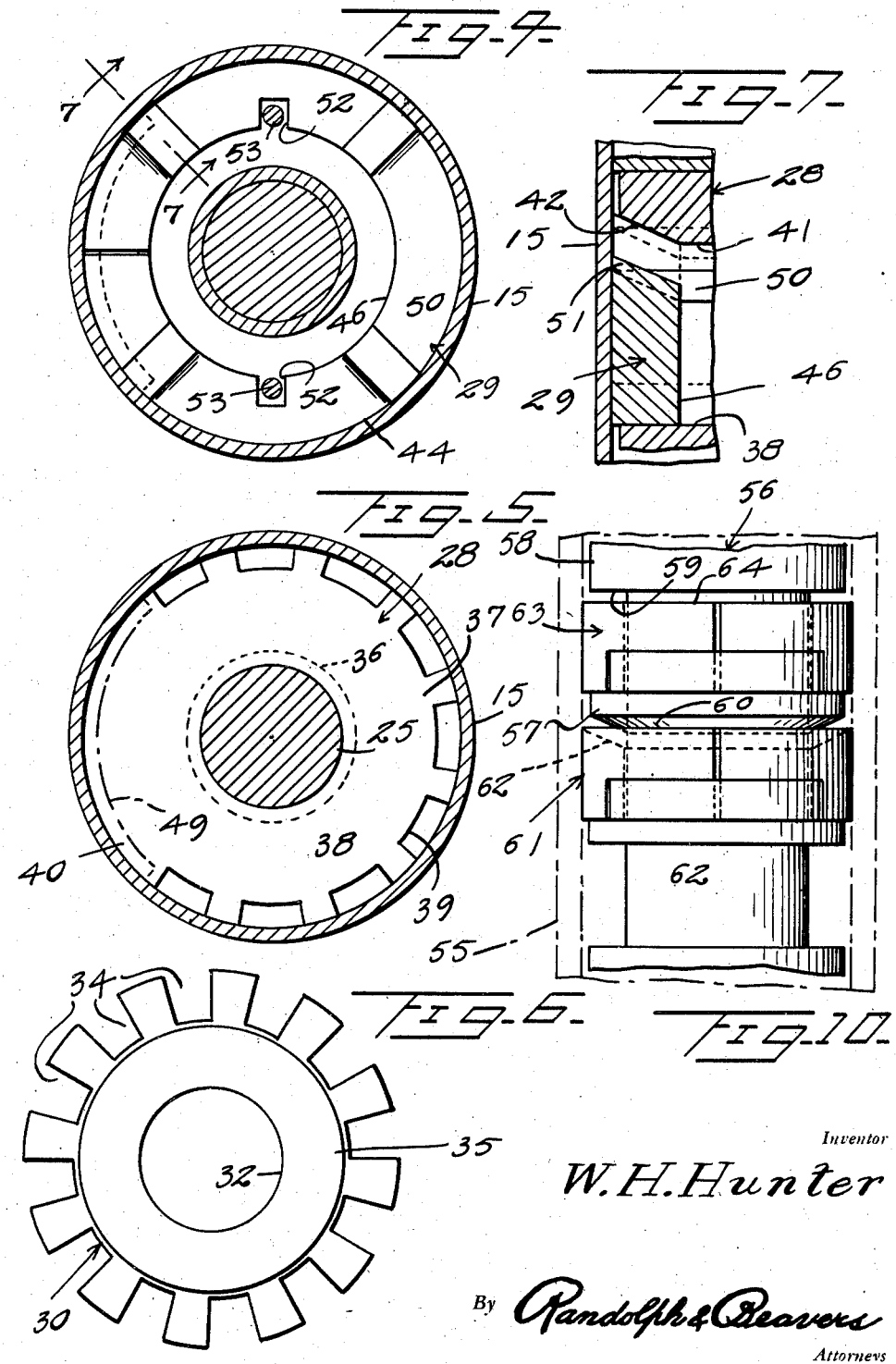

Patented July 12, 1949

2,475,705

UNITED STATES PATENT OFFICE 2,475,705

EXPANSIBLE RING AND GROOVE THEREFOR

William H. Hunter, Aurora, Mo., assignor to W. H. Hunter Engineering Company, Pontiac, Mich., a corporation of Michigan Application August 7, 1946, Serial No. 688,915

4 Claims. (Cl. 103—225)

This invention relates to an improved construction of sealing ring and sealing ring groove for use in working barrel valve bodies or plungers of reciprocating liquid pumps or for use with pistons of internal combustion engines, air compressors, hydraulic rams or other types of pistons employing expansible sealing rings.

The present invention constitutes an improvement on my prior U. S. Letters Patent No. 2,240,780, issued May 6, 1941, and entitled Flat groove valve body and packing means therefor.

More particularly, it is an object of the invention to provide an improved sealing ring and ring groove for use on pump plungers or working barrel valve bodies as well as numerous types of hydraulic plunger pumps, having a novel sleeve construction functioning in combination with the novel sealing ring in units of two or more of each of said elements to form the ring and ring groove combination.

A further object of the invention is to provide a structure of the above type which will be effective to automatically compensate for wear and which is capable of being quickly and easily applied to or removed from a plunger or piston body.

Another object of the invention is to provide a ring and ring groove structure wherein the individual elements thereof are capable of being detachably assembled on a plunger or piston body to facilitate removal or replacement of a damaged or worn part, and which will function efficiently in use to be expanded by a pressure from above, such as a column of liquid supported by the valve body or the expanding gases in a cylinder head for expanding the sealing rings into sealing engagement with a working barrel or cylinder in which the plunger body or piston is reciprocally disposed.

More particularly, and with reference to the use of the invention in connection with a pump plunger, it is an object of the invention to provide a sealing ring and groove construction which will function on the upstroke of a plunger body to support a column of liquid thereabove through utilization of the liquid for retaining the sealing rings in sealing engagement with a working barrel, and which, on the down stroke of the plunger body will permit the trapped liquid located therebeneath to pass upwardly between the sealing rings and ring grooves.

Various other objects and advantages of the invention will hereinafter become more fully apparent from the following description of the drawings, which illustrate preferred embodiments thereof, and wherein:

Figure 1 is a side elevational view showing the invention embodied in a pump plunger and with the working barrel thereof shown in section;

Figure 2 is an enlarged longitudinal sectional view taken substantially along a plane as indicated by the line 2—2 of Figure 1;

Figure 3 is a similar view taken substantially along a plane as indicated by the line 3—3 of Figure 1;

Figures 4 and 5 are cross sectional views through the plunger and working barrel taken substantially along planes as indicated by the lines 4—4 and 5—5, respectively, of Figure 2;

Figure 6 is an enlarged cross sectional view taken substantially along a plane as indicated by the line 6—6 of Figure 1 and with the working barrel omitted;

Figure 7 is a fragmentary longitudinal sectional view taken substantially along a plane as indicated by the line 7—7 of Figure 4;

Figure 8 is a view similar to Figure 7 taken susbtantially along a plane as indicated by the line 8—8 of Figure 2;

Figure 9 is a cross sectional view taken substantially along a plane as indicated by the line 9—9 of Figure 1;

Figure 10 is a fragmentary side elevational view illustrating a modified form of the invention;

Figure 11 is a top plan view of the bottom wear ring;

Figure 12 is a side elevational view of a slightly modified form of the sealing ring, shown removed from the plunger body;

Figure 13 is a horizontal sectional view thereof taken substantially along a plane as indicated by the line 13—13 of Figure 12, and Figure 14 is a vertical sectional view thereof taken substantially along a plane as indicated by the line 14—14 of Figure 12.

Referring more specifically to the drawings, and with reference to Figures 1 to 9, inclusive, a pump working barrel 15 is provided in its lower end with a valve seat 16 on which is detachably mounted a cage 17 which limits the movement of a ball valve 18, relatively to the seat 16.

A plunger or working barrel valve body 19 is reciprocally disposed in the barrel 15, above the cage 17, the valve body 19 being provided with a threaded extension 20 at its upper end which is adapted to be detachably connected to the internally threaded socket 21 on the lower end of a sucker rod 22. The plunger body 19 is preferably provided with a wrench receiving portion 23 located beneath its threaded end 20 and between spaced collars 24 thereof; said portion 23 being adapted to be provided with wrench lands, not shown, if desired. The valve body 19, beneath the lower collar 24, is reduced in diameter to form the elongated portion 25 which is provided with a threaded lower end 26, as seen in Figure 3. A nut 27 provided with annularly flared ends is detachably mounted on the threaded portion 26 for retaining a plurality of sleeves, designated generally 28, a plurality of sealing rings, each designated generally 29, an upper wear collar or ring 30 and a lower wear collar or ring 31 in position on the reduced plunger portion 25.

The upper wear ring or collar 30, as best seen in Figures 2 and 6, is provided with central bore 32 to detachably receive the plunger portion 25 and has a flat upper surface 33, a portion of which bears against the underside of the lower collar 24. The circumference of the body of the ring 30 is slightly smaller than the internal circumference of the barrel 15 and said ring is provided with a plurality of radially disposed outwardly opening notches 34 which are each of a length approximately equal to one-half the radial length of the ring body, between the bore 32 and the circumference thereof. The solid inner part of the ring body is provided with a depending annular projection 35.

The sleeves 28 each include cylindrical or sleeve portions 36, as best seen in Figure 2, of an internal diameter to slidably engage the plunger part 25 and which is provided with a head or collar 37 at the upper end thereof having a flat upper surface 38. The lower end of the extension 35 rests on the upper surface 38 of the uppermost sleeve 28. The head or collar 37 of each sleeve 28, as best seen in Figure 5, is provided with a plurality of notches or recesses 39 in a portion of the periphery thereof and which combine with the internal face of the working barrel 15 to form passages, for purposes which will hereinafter become apparent. The diameter of the head 37 of each sleeve 28 is substantially equal to the internal diameter of the barrel 15 and as seen in Figure 5, the periphery of the head 37 is provided with a portion 40 which is solid in counter distinction to the remainder of the periphery which is provided with the notches or recesses 39, for a purpose which will hereinafter become apparent. The underside of the head 37 is provided with a substantially flat, downwardly facing annular intermediate portion 41 and an upwardly and outwardly inclined annular beveled portion 42, disposed outwardly of the portion 41 and extending to the periphery of the head 37.

As clearly illustrated in Figures 1, 2 and 3, the sleeves 28 are disposed one above the other and beneath the wear ring 30 on the plunger part 25 and the lower ends of the sleeve portions 36 of each sleeve 28 rests on the upper surface 38 of the head of the sleeve 28 disposed therebeneath, with the exception of the lowermost sleeve 28. As best seen in Figure 3, the lower wear collar 31 rests on the upper end of the nut 27 and the upper side thereof engages and supports the lower end of the sleeve portion 36 of the lowermost sleeve 28. The collar 31 is of substantially the same diameter as the internal diameter of the barrel 15 and, as best seen in Figure 11, is provided with substantially flat sides and with notches or recesses 43 in a portion of the periphery thereof and with a solid peripheral portion 43', corresponding to the notches 39 and solid portion 40, respectively of each sleeve head 37, for a purpose which will hereinafter be described.

Each of the sleeve portions 36 combine with the heads or collars 37 located at the ends thereof, to form a ring groove adapted to receive one of the expansion rings 29. Each of the rings 29 includes a main body section 44 of annular form and which is split along a transverse line 45, as best seen in Figures 1 and 2. The ring body 44 is provided with a bore 46 which is substantially larger in diameter than the sleeve portion 36 to form an annular space therebetween. The body portion 44 is provided with an external outwardly opening recess 47 which extends from its bottom edge 48 to a point intermediate of its upper and lower edges and which is of a length preferably equal to an arc of approximately 90 degrees. The split in the ring body 44, indicated by the line 45, intersects the recess 47 intermediate of the ends thereof. An arcuate strip 49 is sized and shaped to fit the recess 47 and to substantially fill the same. The bottom edge of the insert 49 is normally disposed flush with the bottom edge 48 of the ring body 44 the periphery of said insert 49 is disposed flush with the adjacent portions of the periphery of the body 44. Since the ends of the insert 49 are out of registry with the ends of the body 44, said insert combines with body to form a solid lower portion in the ring 29.

The upper surface of the ring body 44 is beveled to form a downwardly and inwardly inclined annular portion 50 having circumferentially spaced raised portions 51, the upper surfaces of which are disposed parallel to the upper surface 50. The ring body 44 is provided with recesses or notches 52 which open inwardly into the bore 46 and upwardly into the beveled face 50 and which are adapted to receive depending pins or projections 53 of the sleeves 28 which depend from the beveled surfaces 42 thereof, as best seen in Figure 3. The projections 53 and recesses 52 are arranged to prevent rotation of the rings 29 relatively to the sleeves 28 and to retain the rings 29 so that the inserts 49 thereof will rest on the solid portions 40, as indicated in broken lines in Figure 5. The bottom face of the lowermost ring 29 rests on the upper face of the lower wear collar 31, as best seen in Figure 3.

As will be readily apparent from a consideration of Figures 4 and 5, the plunger body 19 is solid. Accordingly, in the operation of the plunger 19 the liquid to be pumped upwardly through the working barrel 15 must pass around the plunger body 19 instead of passing therethrough, as in my prior patent, previously referred to. On the upstroke of the sucker rod 22 which raises the plunger body 19 and the parts carried thereby in the working barrel 15, the column of liquid disposed above the plunger 19 will be raised and a vacuum will be created between the plunger and the stationary seat 16 which will unseat the ball valve 18 thereof to admit the liquid into the working barrel 15 beneath the plunger 19. When the sucker rod 22 and plunger 19 begin their downstroke, the valve 18 will return to a closed position for trapping the liquid beneath the plunger 19. As the plunger 19 moves on its downstroke, the liquid contained therebeneath in the barrel 15 will pass upwardly through the recesses 43 to lift the lower sealing ring 29 so that the liquid may pass between the bore 46 and the sleeve portion 36 thereof and outwardly between the beveled upper surface 50 and the adjacent, beveled under surface 42, which surfaces are held out of engagement by the projections 51 which bear against said surfaces 42. The liquid will thereafter pass through the recesses or notches 39 of the head 37 of the lowermost sleeve 28 to unseat the ring 29 disposed thereabove and to pass upwardly therethrough, in the manner previously described in reference to the lowermost ring 29. In this manner the liquid will pass upwardly between the working barrel 15 and plunger 19 to a location above said plunger and in so doing will carry with it any accumulation of sand or dirt contained in the parts supported by the plunger 19. On the next upstroke of the plunger 19 this column of liquid will be raised and additional liquid will be drawn into the lower end of the working barrel 15, in the manner previously described. On the upstroke of the plunger 19 a part of the liquid will pass downwardly through the notches 34 of the upper wear ring 30 and through the notches 39 of the upper sleeve 28 and by impingement against the beveled face 50 of the upper ring 29 will force the lower surface 48 of said ring into sealing engagement with the upper surface of the head 37 of the sleeve 28 disposed therebeneath. The liquid will fill the annular chamber between the uppermost sleeve portion 36 and the wall of the bore 46 of the uppermost ring 29 for expanding said ring into effective sealing engagement with the inner face of the working barrel 15 to prevent leakage of the liquid around the outer side of this ring. Any liquid which may escape or the liquid which had not completed its movement past all of the rings 29 on the last down stroke of the plunger 19, will similarly act on the other rings 29 for expanding them into sealing contact with the barrel 15 and the upper surfaces of the heads of the sleeves 28.

A modified construction of the sealing ring, designated generally 29', is illustrated in Figures 12, 13 and 14 and differs from the ring 29 only in respect to the shape of its recess 47' and its insert 49' which differ from the recess 47 and 49, respectively, in that the recess 47' is provided with end walls which converge toward the bottom surface of the ring 29 and the insert 49' is provided with similarly shaped ends. The edge walls of the recess 47' are provided with a continuous groove 54, adjacent the bed of the recess 47' and insert 49' provided with a continuous rib 54' which projects from the inner part of the edge thereof and which fits into the groove 54, as seen in Figures 12 and 13.

The insert 49' will cooperate with the recess 47' to effectively prevent the former from becoming disengaged from the latter while the plunger 19 is installed and inserted into the working barrel 15 or while being withdrawn from the well.

Another embodiment of the invention is illustrated in Figure 10 wherein a cylinder of an internal combustion engine, air compressor, hydraulic ram or similar mechanisms is indicated by broken lines at 55 and is shown containing a reciprocating piston 56 having sleeves 57 and 58 mounted thereon, preferably in the same manner as the sleeves 29 are mounted on the plunger part 25. The sleeves 57 and 58 are provided with heads at their upper ends having flat upper surfaces and the underside 59 of the upper sleeve 58 is likewise flat whereas the underside of the head of the lower sleeve 57 is beveled, as indicated at 60, for the same purpose as the beveled undersides of the heads of the sleeves 29. The lower sleeve 57 supports a ring 61 which is located thereon between the head thereof and a detachable nut 62 of the piston 56. The ring 61 is provided with a beveled upper surface 63, corresponding to the surface 60, disposed thereabove but which is not provided with the raised portion 51 or the recesses 52 as in the surface 50 of the ring 29. In all other respects, the ring 61 corresponds to the ring 29. The upper ring 63 differs from the lower ring 61 only in that it is provided with a flat upper surface 64 which is disposed beneath the flat underside 59 of the head of the sleeve 58. On the power of down stroke of the piston 56 the exhaust gases will pass around the head of the sleeve 58 and between the faces 59 and 64 and into the space between the sleeve 58 and the bore of the ring 63 to expand said ring into sealing engagement with the inner wall of the cylinder 55. Any gases escaping past the upper ring 63 will be trapped in and expand the lower ring 61 in the same manner. On the up or compression stroke of the piston 56, the rings 61 and 63 will be retained in their lower-most position by frictional engagement with the cylinder 55 and by the compressed medium above the piston 56, a portion of which is trapped in the rings 61 and 63. Obviously, either the rings 61 and sleeves 57 or the rings 63 and sleeves 58 could be utilized exclusively with the pistons 56.

The rings 29, 29', 61 and 63 may be formed of any suitable material which is flexible and preferably relatively elastic, including various metals.

Various other modifications and changes are likewise contemplated and may obviously be resorted to without departing from the spirit and scope of the invention as hereinafter defined by the appended claims.

I claim:

1. In a sealing ring for reciprocating pistons, an annular body of relatively elastic material adapted to be mounted in a ring groove of a reciprocating piston, said annular body having a bore normally spaced from the bed of the ring groove, said annular body being split to form abutting end faces, a portion of the periphery of the body being provided with an outwardly opening recess intersecting said end faces, an arcuate insert disposed in and normally filling said recess, said recess and insert having interengaging beveled edge portions for detachably retaining the insert in the recess, said annular body being provided with a downwardly and inwardly beveled upper surface adapted to be normally disposed in spaced apart, substantially parallel relationship to a beveled surface of the ring groove, and means on said annular body to retain said upper surface out of engagement with the beveled surface of the ring groove, said means for retaining the upper surface of the ring body out of engagement with the beveled surface of the ring groove comprising a plurality of circumferentially spaced projections on said ring body, disposed above the upper beveled surface thereof and each having an upper surface disposed substantially parallel thereto.

2. In a sealing ring and ring groove structure for use with pistons and pump plungers having restricted stem portions, a plurality of sleeve members adapted to be detachably mounted in abutting end-to-end relationship on the restricted stem of a piston or pump plunger, each of said sleeve members having a circumferentially enlarged head at a corresponding end thereof provided with a substantially flat outer surface and a beveled inner surface, the head portions of said sleeves being provided with recesses or notches opening outwardly of portions of the periphery thereof; an expansible split sealing ring located on each of said sleeve members and between two of said head portions, said rings having normally abutting end faces, each of the rings being provided with an outwardly opening recess in the periphery thereof intersecting with its split portion, an arcuate insert normally filling said recess, said recess and insert having interengaging beveled edge portions for detachably retaining the insert in the recess, the width of said rings being less than the distance between the head portions of the sleeve members, and said rings being provided with beveled upper surfaces disposed in substantially parallel and spaced relationship to the under beveled surfaces of said head portions.

3. A ring and groove structure as in claim 2, the head portions of said sleeve members each being provided with a solid peripheral portion for engagement with the ring insert, said head portions being provided with depending projections, and recesses in the rings for receiving said projections to prevent rotation of the rings relatively to the sleeve members.

4. A ring and groove structure as in claim 2, and wear rings or collars disposed on the piston or plunger shank at each end of the set of sleeve members and rings supported thereby, said wear rings having notches or recesses in the peripheries thereof, and the wear ring at one end of the unit forming a support for an end of one of the sealing rings.

WILLIAM H. HUNTER.

REFERENCES CITED

The following references are of record in the file of this patent:

UNITED STATES PATENTS

| Number | Name | Date |
| --- | --- | --- |
| 1,527,794 | Gray | Feb. 24, 1925 |
| 1,567,827 | Zublin | Dec. 29, 1925 |
| 1,832,279 | Clifford | Nov. 17, 1931 |
| 2,176,231 | Swortwood et al. | Oct. 17, 1939 |
| 2,240,780 | Hunter | May 6, 1941 |